(12) United States Patent
Nappini et al.

(10) Patent No.: US 6,264,204 B1
(45) Date of Patent: Jul. 24, 2001

(54) SEALING DEVICE FOR EXPLOSION-PROOF MOTORS

(75) Inventors: Francesca Nappini, Monza; Enrico Perissinotto, Milan, both of (IT)

(73) Assignees: Abb Industria S.p.A., Sesto San Giovanni; Consorzio Abb per lo Sviluppo Tecnologico, Milan, both of (IT)

( * ) Notice: Subject to any disclaimer, the term of this patent is extended or adjusted under 35 U.S.C. 154(b) by 0 days.

(21) Appl. No.: 09/151,586

(22) Filed: Sep. 11, 1998

(30) Foreign Application Priority Data

Sep. 17, 1997 (IT) .............................. MI97A2111

(51) Int. Cl.$^7$ ...................................... F16J 15/38
(52) U.S. Cl. ...................... 277/391; 277/411; 277/504; 277/634; 310/88; 310/90; 384/141; 384/476
(58) Field of Search ................... 277/315, 361, 277/362, 364, 391, 411, 424, 502, 504, 544, 545, 634, 903, 908; 310/88, 90, 91; 384/141, 476

(56) References Cited

U.S. PATENT DOCUMENTS

| | | | |
|---|---|---|---|
| 3,978,357 | * | 8/1976 | Voelbel et al. ................. 310/91 X |
| 4,360,208 | * | 11/1982 | Hill et al. ..................... 277/561 X |
| 4,513,473 | * | 4/1985 | Omata . |
| 4,814,651 | * | 3/1989 | Elris et al. ..................... 310/88 |
| 5,058,905 | * | 10/1991 | Nosowicz et al. ............. 277/362 X |
| 5,099,709 | * | 3/1992 | Berselli ........................ 277/634 X |

FOREIGN PATENT DOCUMENTS

| | | |
|---|---|---|
| 27 06 511 | 8/1978 | (DE) . |
| 29 01 111 | 7/1980 | (DE) . |
| 37 13 921 | 11/1988 | (DE) . |
| 38 04 602 | 8/1989 | (DE) . |
| 0 291 295 | 11/1988 | (EP) . |
| 0 472 929 | 3/1992 | (EP) . |

* cited by examiner

Primary Examiner—Robert J. Sandy
Assistant Examiner—Karlena D. Schwing
(74) Attorney, Agent, or Firm—Guido Modiano; Albert Josif; Daniel O'Byrne

(57) ABSTRACT

A sealing device for explosion-proof motors, the particularity of which is the fact that it comprises a first element which is coupled to the motor casing and a second element which is coupled to the driving shaft through rolling means; the first and second elements are mutually coupled through elastic elements to allow their relative movement.

19 Claims, 2 Drawing Sheets

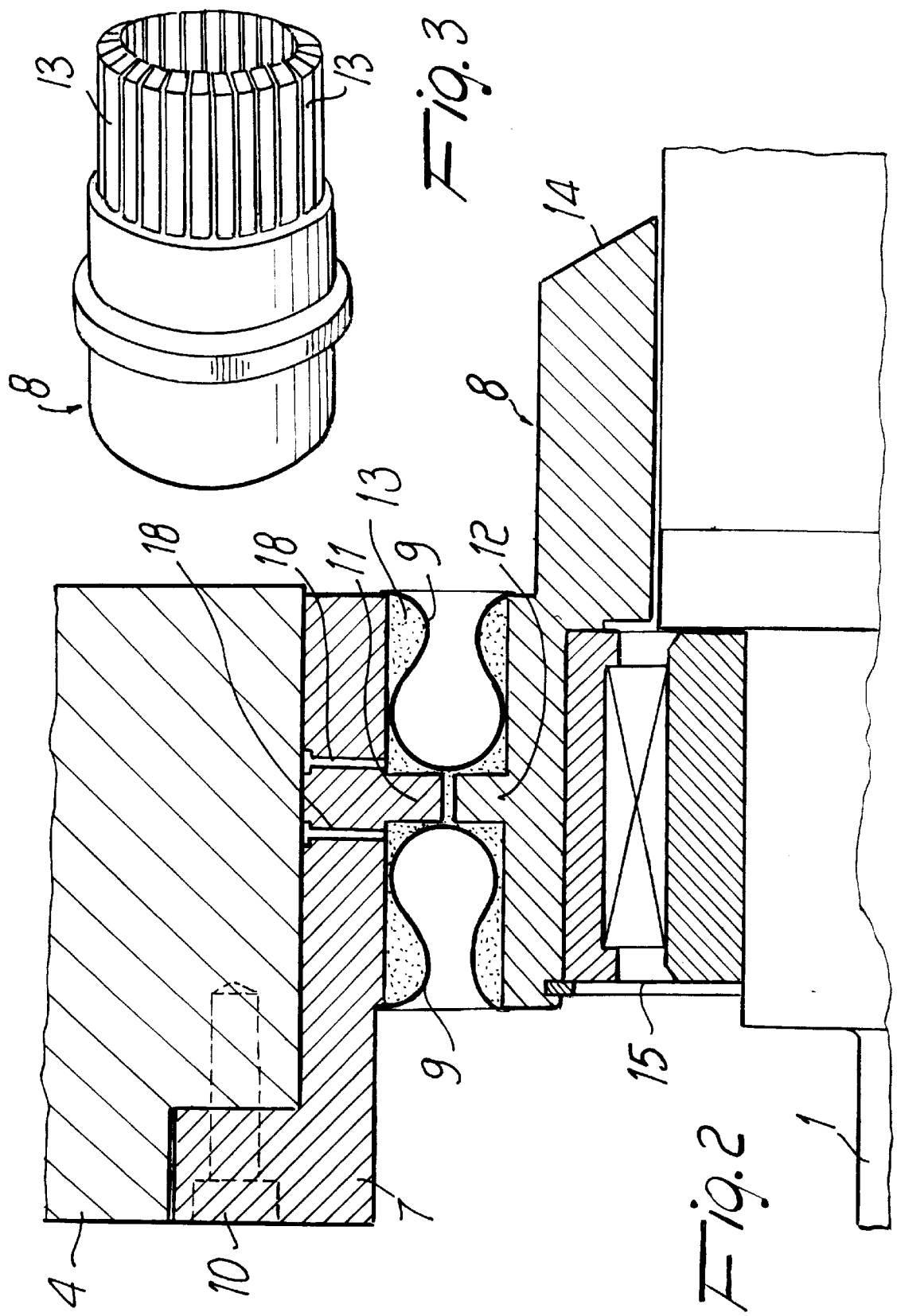

SEALING DEVICE FOR EXPLOSION-PROOF MOTORS

BACKGROUND OF THE INVENTION

The present invention relates to a sealing device for explosion-proof motors. More particularly, the invention relates to a sealing device for preventing any flames generated within the casing of the motor from escaping outside through the gap between the driving shaft and the casing of said motor.

It is known that explosion-proof motors, i.e., motors in which the safety aspect is essential because they must operate in dangerous environmental conditions, for example in the presence of flammable or explosive substances, have a sealing device which is arranged between the shaft of the motor and the casing and is rigidly coupled to said casing.

Explosion-proof motors can be manufactured, depending on the load to be driven, with driving shaft supports equipped with rolling bearings or with a plain bearing (bushing).

In the latter case, the coupling tolerances between the shaft and the support are greater than in the rolling-bearing solution. Given an equal precision class, machining tolerances are a function of size and increase as said size increases.

Accordingly, larger driving shafts require tolerances which are higher in terms of absolute value and are more critical as regards providing the seal.

Qualification tests for motors are performed while the motor is motionless and/or rotating.

In view of what has been described above, the qualification of bushing-supported motors is more critical for the following reasons:

the size of the passage through the sealing device is larger;

when the motor is not moving, since the shaft does not have the hydrodynamic support generated by the film formed by the oil when the motor turns, said shaft rests on the bushing. Since the sealing device is rigidly coupled to the casing of the motor, in this situation the thickness of the passage in the sealing device appears to be twice bigger than that when the motor is running and when the shaft is supported by means of a rolling bearing.

Accordingly, the considerable thickness of the passage makes the motor unsuitable for use as an explosion-proof motor.

Moreover, the driving shaft must be shaped appropriately so as to form a sort of labyrinth which loosely couples in the complementarily shaped sealing device.

FIG. 1 is a schematic view of a conventional driving shaft 1, whose outer surface is machined so as to form a labyrinth-like profile 2 which accommodates the sealing device 3 having a complementarily shaped labyrinth-like profile and being rigidly coupled to the casing 4 of the motor.

In order to allow the driving shaft 1 to rotate freely, a certain clearance, designated by the reference numerals 5 and 6 in FIG. 1, must necessarily be left.

Since the driving shaft 1 must rotate within the sealing device 3, it is also necessary to leave, between the shaft 1 and the sealing device 3, a certain space which does not comply with standards concerning explosion-proof motors.

SUMMARY OF THE INVENTION

The aim of the present invention is to provide a sealing device for explosion-proof motors which allows to maintain the free space between the casing and the driving shaft at a constant value which is equal to the minimum prescribed value.

Within the scope of this aim, an object of the present invention is to provide a sealing device for explosion-proof motors which allows to maintain the free space between the casing and the shaft at a minimum value for any driving shaft size.

Another object of the present invention is to provide a sealing device for explosion-proof motors which allows to improve the ability to extinguish the flame which might be generated inside the motor casing.

Another object of the present invention is to provide a sealing device for explosion-proof motors which is highly reliable, relatively easy to manufacture and at low costs.

This aim, these objects and others which will become apparent hereinafter are achieved by a sealing device for explosion-proof motors having a motor casing and a driving shaft rotatable in the casing, characterized in that it comprises: a first element which is coupled to the motor casing; a second element which is coupled to the driving shaft through a rolling means, said first and second elements being mutually coupled by way of elastic means so as to allow their relative movement.

BRIEF DESCRIPTION OF THE DRAWINGS

Further characteristics and advantages of the invention will become apparent from the following detailed description of a preferred but not exclusive embodiment of the device according to the invention, illustrated only by way of non-limitative example in the accompanying drawings, wherein:

FIG. 2 is a partial sectional view, similar to FIG. 1 but showing in this case the sealing device according to the present invention;

FIG. 3 is a perspective view of a portion of the sealing device according to the present invention.

DESCRIPTION OF THE PREFERRED EMBODIMENTS

Figure 4:
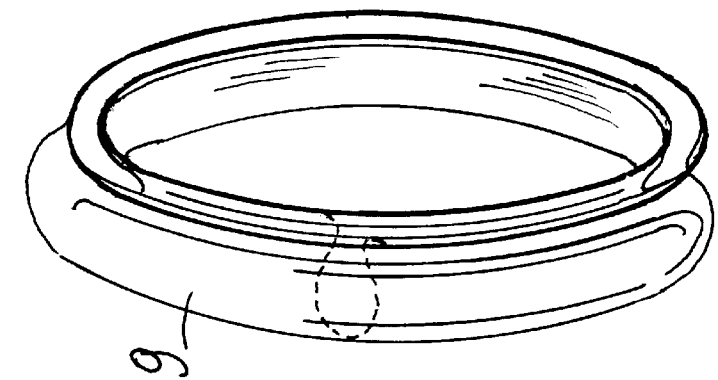
FIG. 4 is a perspective view of an elastic element which is part of the sealing device according to the present invention.
Figure 1:
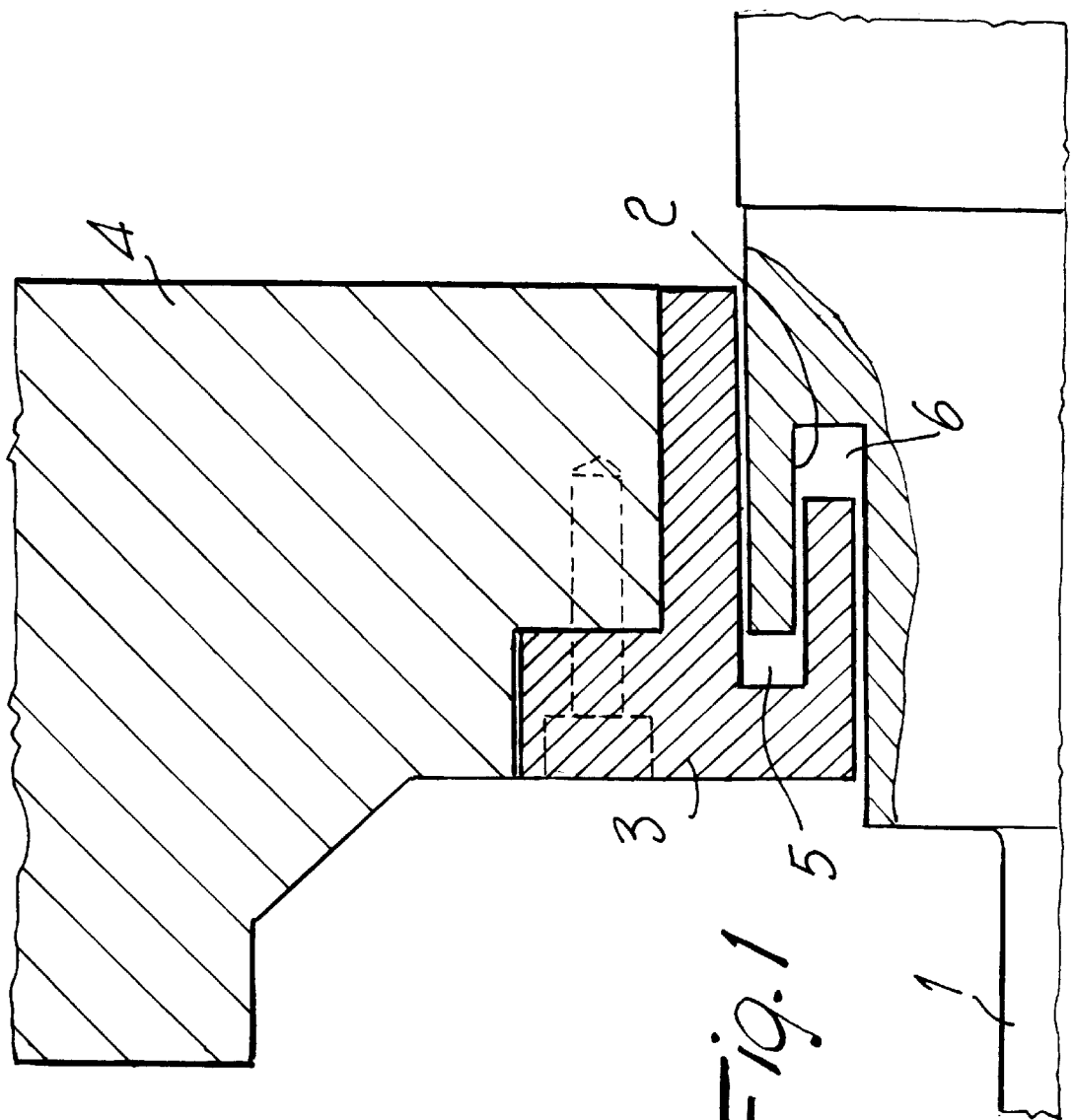
FIG. 1 is a partial sectional view of a driving shaft accommodated in a casing of an explosion-proof motor, with a conventional sealing device.

In the various figures, identical elements are designated by the same reference numerals.

With reference to FIGS. 2 to 4, the sealing device according to the present invention is constituted by a first sealing element 7, which is coupled to the casing 4 of the motor, and by a second sealing element 8, which is coupled to the shaft 1 of the motor through the interposition of rolling means 15, said rolling means being advantageously provided, for example, by a rolling bearing.

Elastic means 9 are provided to connect the first element 7 to the second element 8 so as to allow a relative movement between the first element 7 and the second element Advantageously, the elastic means are provided for example by an elastic membrane which has an omega-shaped cross-section or is accordion-shaped or has any other suitable shape and is welded between the first and second elements.

In detail, the elastic membrane has an annular configuration, as shown in FIG. 4, and two elastic membranes 9 are provided.

In this manner it is possible to reduce to a minimum the space between the second sealing element 8 and the shaft 1, since the movement of the shaft with respect to the casing, during rotation, is allowed by the elastic means 4.

The first element 7 is advantageously connected to the casing 4 through a connecting means 10 which rigidly couples the element 7 thereto.

The first element and the second element are advantageously provided with a tooth each; said teeth are respectively designated by the reference numerals 11 and 12, face each other and are arranged so that there is one of the elastic membranes 9 on either side of the two teeth 11 and 12.

The teeth 11 and 12 are meant to constitute supporting elements for the elastic membranes 9 to relieve the stress that may act thereon in case of an explosion inside the casing 4 of the motor. In this case, the stress the elastic membranes 9 are subjected to is damped by their contact against the teeth 11 and 12.

For this purpose, the teeth 11 and 12 can advantageously have a curved profile that matches the profile of the membranes 9 in order to extend the contact surface of the elastic membranes 9 if they are subjected to stress.

The spot-welds between the membranes 9 and the first and second elements 7 and 8 can be rounded, eliminating the sharp edges so as to improve the resistance of the membranes stressed by the rotation of the driving shaft 1 inside the casing 4.

A filler material 13 can also be provided between the membranes 9 and the elements 7 and 8 which can be solid or liquid (for example oil).

In this case, filling and draining channels 18 must be provided to introduce said filler material in the free space between the membranes and the sealing elements 7 and 8.

The second element 8 constitutes a two-part bushing, where the surface of the free portion (i.e., the portion whereto the elastic membrane 9 is not welded or otherwise connected) has a series of longitudinal slits, designated by the reference numeral 13 in FIG. 3, forming a plurality of fins which accordingly have a longitudinal configuration and a radial direction, to extinguish the flame that might develop inside the sealing channel.

Flame extinguishing is due to the cooling of said flame to a temperature below the propagation stability value: this is an extremely rapid phenomenon and the exchange surface is limited.

The presence of the fins on the surface of the second element 8 offers the following advantages:
  an increase by one order of magnitude of the exchange surface;
  the expansion of the fumes inside the channels between mutually adjacent fins;
  an increase in the retention time and in heat exchange.

The flame cannot propagate in the channels between adjacent fins since the size of said channels is advantageously chosen so that it is smaller than the minimum size deemed safe for the propagation of a flame inside an explosion-proof motor.

Moreover, the second element 8 is advantageously provided with a flared portion 14 which deflects upward the flame (which might have developed because of an internal explosion), reducing the possibility of said flame being guided into the free space between the second element 8 and the driving shaft 1, and thus constituting an additional safety in addition to the two-part configuration of the sealing device and to the cooling fins provided on the surface of the second element 8.

In practice it has been observed that the sealing device according to the invention fully achieves the intended aim, since it allows to provide an optimum seal for an explosion-proof motor, minimizing the space between the casing and the shaft, through the separation of the sealing element into two mutually elastically connected parts.

The device thus conceived is susceptible of numerous modifications and variations, all of which are within the scope of the inventive concept; all the details may also be replaced with other technically equivalent elements.

In practice, the materials employed, so long as they are compatible with the specific use, as well as the dimensions, may be any according to requirements and to the state of the art.

The disclosures in Italian Patent Application No. MI97A002111 from which this application claims priority are incorporated herein by reference.

What is claimed is:

1. A combination of a sealing device for explosion-proof motors, a motor casing and a driving shaft rotatable in the casing, comprising: a first element which is coupled to the motor casing; a second element which is coupled to the driving shaft, through rolling means, said first and second elements being mutually coupled by way of elastic means so as to allow relative movement of said first and second elements, the device further comprising on a surface of said second sealing element, a plurality of longitudinal slits, said slits forming a plurality of radially inclined fins for flame cooling and extinguishing.

2. The combination of claim 1, wherein said elastic means are constituted by at least one elastic membrane which is rigidly connected to said first element and to said second element.

3. The combination of claim 2, wherein at least one of said first and second elements has a tooth, said tooth constituting an abutment for said elastic membrane upon development of an internal explosion applying pressure to said elastic membrane.

4. The combination of claim 2, comprising two elastic membranes, each of which is connected to said first and second elements.

5. The combination of claim 1, wherein said rolling means comprise a roller bearing which is rigidly coupled to said second element.

6. The combination of claim 1, comprising connecting means for connecting said first element to said casing.

7. The combination of claim 1, wherein said second element has an upper surface which is directed toward the inside of said casing and is inclined in order to deflect the flame away from a free space between said second element and said driving shaft.

8. The combination of claim 1, comprising a free space between said elastic means and said first and second elements, said free space being filled with a filler material.

9. The combination of claim 8, comprising two filling and draining channels provided in said first element for introduction and draining of said filler material.

10. The combination according to claim 1, wherein said at least one elastic membrane is made of metal.

11. A combination of a sealing device for explosion-proof motors, a motor casing and a driving shaft rotatable in the casing, comprising: a first element which is coupled to the motor casing; a second element which is coupled to the driving shaft, through rolling means, said first and second elements being mutually coupled by way of elastic means so as to allow relative movement of said first and second elements, wherein said elastic means comprising two elastic membranes each of which is rigidly connected to said first element and to said second element.

12. The combination of claim 11, further comprising on a surface of said second sealing element, a plurality of longitudinal slits, said slits forming a plurality of radially inclined fins for flame cooling and extinguishing.

13. The combination of claim 11, wherein at least one of said first and second elements has a tooth, said tooth constituting an abutment for said elastic membrane upon development of an internal explosion applying pressure to said elastic membrane.

14. The combination of claim 11, wherein said rolling means comprise a roller bearing which is rigidly coupled to said second element.

15. The combination of claim 14, comprising connecting means for connecting said first element to said casing.

16. The combination of claim 11, wherein said second element has an upper surface which is directed toward the inside of said casing and is inclined in order to deflect a flame, generated by an internal explosion, away from a free space between said second element and said driving shaft.

17. The combination of claim 11, comprising a free space between said elastic means and said first and second elements, said free space being filled with a filler material.

18. The combination of claim 17, comprising two filling and draining channels provided in said first element for introduction and draining of said filler material.

19. The combination according to claim 11 wherein said at least one elastic membrane is made of metal.

* * * * *